United States Patent [19]

Lönne

[11] 4,284,282
[45] Aug. 18, 1981

[54] SEALING GASKET

[75] Inventor: Klaus Lönne, Burscheid, Fed. Rep. of Germany

[73] Assignee: Goetze AG, Burscheid, Fed. Rep. of Germany

[21] Appl. No.: 121,512

[22] Filed: Feb. 14, 1980

[30] Foreign Application Priority Data

Feb. 17, 1979 [DE] Fed. Rep. of Germany ....... 2906127

[51] Int. Cl.³ .............................................. F16J 15/06
[52] U.S. Cl. ................................. 277/235 B; 277/234
[58] Field of Search .................... 277/1, 235 R, 235 A, 277/235 B, 229, 234, 236

[56] References Cited

U.S. PATENT DOCUMENTS

| 1,815,602 | 7/1931 | Russell | 277/235 B X |
| 3,565,449 | 2/1971 | Ascencio et al. | 277/235 B |
| 3,970,322 | 7/1976 | Stecher et al. | 277/235 A |

FOREIGN PATENT DOCUMENTS

| 1525811 | 5/1970 | Fed. Rep. of Germany. | |
| 2028498 | 12/1970 | Fed. Rep. of Germany. | |
| 1943810 | 8/1971 | Fed. Rep. of Germany | 277/235 B |
| 2304505 | 3/1977 | Fed. Rep. of Germany. | |
| 1057861 | 2/1967 | United Kingdom | 277/235 B |
| 1170251 | 11/1969 | United Kingdom | 277/235 R |

Primary Examiner—Robert S. Ward, Jr.
Attorney, Agent, or Firm—Spencer & Kaye

[57] ABSTRACT

A sealing gasket has at least one framed throughgoing opening; the frame is formed of at least two superposed bent sheet metal border flanges which have a U-shaped cross section and which have legs of unlike lengths. The border flanges fully overlap the soft material of the gasket without forming an appreciable hollow space underneath the legs.

4 Claims, 4 Drawing Figures

SEALING GASKET

BACKGROUND OF THE INVENTION

This invention relates to a sealing gasket, particularly to a cylinder head gasket for an internal combustion engine. The sealing gasket comprises a soft-material plate which may be reinforced by metal inserts and which has openings for the mounting bolts, the engine coolant, the lubricant and the combustion chambers. At least one of the openings in the sealing gasket is framed by a metallic border flange formed of two superposed, bent sheet metal members which have a U cross section.

The gasket openings associated with the combustion chambers of the engine are preferably provided with metallic border flanges as outlined above, because in the zones of such openings the stress exerted on the gasket by the hot combustion gases is at a maximum. Such metallic border flanges are formed, as a rule, of a sheet metal member bent over the edge of the gasket opening onto opposite sides of the gasket, whereby the border flanges have a U-shaped cross section. Apart from a particular protective effect in the framed zone of the gasket, there is obtained a sealing pressure which is increased due to the thickness of the border flange and thus superior sealing properties are ensured.

In high-load internal combustion engines, however, the above-outlined measures concerning the sealing gasket are usually not sufficient because of the high compression. Since the thickness of the sheet metal from which the border flanges are made cannot be increased at will, the corresponding gasket zones have been provided with additional overlays, or additional insert rings are placed under or on the border flanges. In accordance with a solution disclosed in German Pat. No. 1,525,811, the ends of the border flange legs are folded over, so that an additional sealing pressure is obtained in a simple manner, while, at the same time, a barrier effect is achieved against the pressure-caused flow of the soft material of the gasket. In such a case, however, the sealing starts only at the ends of the border flange legs, so that the hot combustion gases may flow in the gap up to the folded-over legs and in their path they may destroy the soft material of the gasket as well as the sheet metal of the border flange.

German Laid-Open Application (Offenlegungsschrift) No. 2,028,498 proposes to superpose a second border flange sheet of U-shaped cross section on the usual border flange. The second border flange is significantly thicker than the usual border flange it surrounds, for the purpose of achieving a particular protective effect. Such a measure, however, requires the provision of particular recesses in the engine block and the cylinder head for accommodating the thick border flanges; the recesses have to be dimensioned very accurately. Consequently, such a gasket cannot find universal application.

SUMMARY OF THE INVENTION

It is an object of the invention to provide a sealing gasket of the above-discussed type which has a metallic border flange framing a gasket opening, which ensures a good protection as well as an optimal sealing pressure along the framed sealing edge and which can find universal application particularly in up-to-date high-performance engines without the need for alterations on the sealing faces of the engine block or the cylinder head. It is a further object of the invention to provide such border flanges in a simple and economical manner.

These objects and others to become apparent as the specification progresses, are accomplished by the invention, according to which, briefly stated, there is provided a sealing gasket having at least one framed throughgoing opening, wherein the frame is formed of at least two superposed bent sheet metal border flanges which have a U-shaped cross section and which have legs of unlike lengths. The border flanges fully overlap the soft material of the gasket without forming an appreciable hollow space underneath the legs.

The sealing gasket according to the invention has, in the framed areas, at least two zones having unlike properties of deformation, resulting in pressure differences of the sealing gasket in the installed state. The sealing pressure is the greatest immediately at the sealing edge because of the greater total thickness of the border flange, thus preventing hot or corrosive media from penetrating any further. At the leg ends of the first (inner) border flange the sealing pressure abruptly drops corresponding to the reduced total thickness of the border flange, so that at those locations there exists only a protection against additional stresses of the quasi-static type. By an appropriate selection of the sheet metal thicknesses for the border flanges, the required sealing pressure may be set at will. By using more than two superpositioned border flanges, the abruptness of the sealing pressure drop can be moderated by a gradual step-down at the leg ends.

According to a preferred embodiment of the invention, in the cylinder head gasket each frame surrounding an opening associated with a combustion chamber of the internal combustion engine is formed of two superposed inner and outer sheet metal border flanges, wherein the outer border flange has longer legs than the inner border flange. In this manner both border flanges are anchored in the soft material of the sealing gasket and are secured against slippage which may cause breakage of the border flanges.

The border flanges according to the invention are preferably used in connection with impregnated cylinder head gaskets of the type disclosed in U.S. Pat. No. 3,970,322 (Stecher et al). According to this patent, the stamped and framed cylinder head gaskets are impregnated, preferably by immersion, so that the zone underneath the border flanges remains free from the impregnating material. This, however, is not ensured reliably and thus during the impregnating process impregnating material may pass into gasket regions underneath the border flanges, whereby the flow limit (yield point) of the soft material and thus the sealing pressure are lowered. By utilizing, however, the border flanges structured according to the invention, the impregnating material which, because of the lowered sealing pressure, penetrates at the leg ends of the outer border flange causes less disturbance. On the other hand, the gasket zone having a high sealing pressure under the double thickness of the border flange is additionally protected by the longer leg of the outer border flange, so that there no impregnating material can penetrate which would adversely affect the flow limit of the soft material of the sealing gasket and the sealing pressure.

DESCRIPTION OF THE PREFERRED EMBODIMENT

Figure 1:
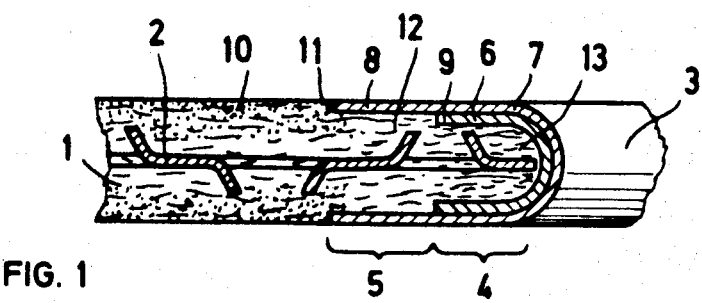
FIG. 1 is a fragmentary sectional view of a preferred embodiment of the sealing gasket according to the invention.

Turning now to FIG. 1, there is shown a fragmentary portion of a cylinder head gasket 1 made of asbestos fiber and including reinforcing metal sheet elements 2. The gasket 1 has a fragmentarily shown circular opening 3 which is to be aligned with a combustion chamber of an internal combustion engine in which the gasket finds application. The edge regions 4 and 5 of the opening 3 are provided with a sheet metal frame formed of two superimposed border flanges 6 and 7 which are approximately of the same thickness and which are both bent into a U shape to lie over opposite surface portions of the gasket in the zone of the opening 3. The length of the legs 8 of the outer border flange 7 is about twice the length of the legs 9 of the inner border flange 6. It is noted that the legs of the outer border flange 7 should preferably be at least ⅓ longer than the legs of the inner border flange 6. Further, the thicknesses of the inner and outer border flanges may be unlike. The soft-material gasket contains an impregnating material 10 which is present particularly in the gasket portions that are free from the border flanges but which, nevertheless, may extend slightly into gasket portions in the zone 5 at ends 11 of the outer legs 8. The zones 12 and 13 underneath the border flanges are fully filled with the soft material of the gasket, and the zone 13 underneath the inner border flange 6 is entirely free from the impregnating material 10 (which may be of the type discussed in U.S. Pat. No. 3,970,322).

Figure 2:
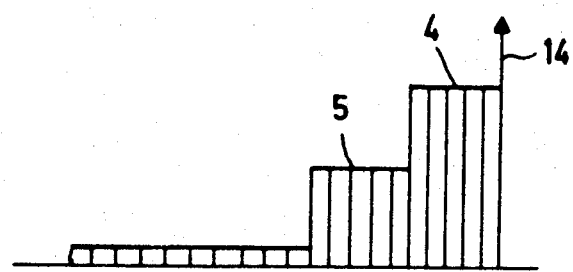
FIG. 2 is a diagram illustrating sealing pressure conditions in different zones of a sealing gasket according to the invention.

FIG. 2 illustrates the relative magnitudes of the sealing pressure 14 in the individual zones of the sealing gasket in its installed state. The sealing pressure 14 is at its maximum in the zone 4 of the inner border flange 6, it drops abruptly in the zone 5 and is relatively small in the other parts of the gasket.

Figure 3:
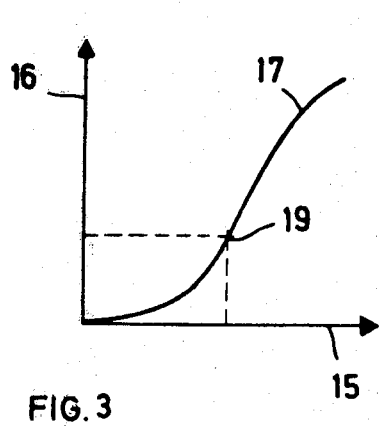
FIGS. 3 and 4 are diagrams illustrating the deformation of the seal in the framed zones.
Figure 4:
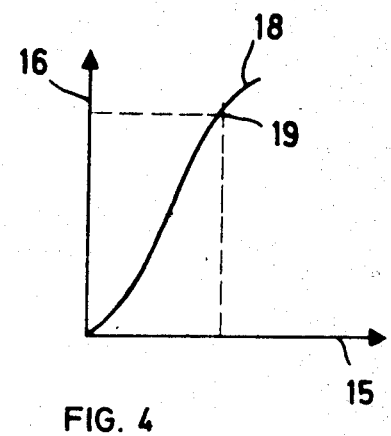

In the diagrams illustrated in FIGS. 3 and 4 the deformation 15 of the sealing is shown as a function of the pressure 16. The deformation curve 17 in FIG. 3, relating to the zone 5, shows a significantly flatter course than the deformation curve 18 of FIG. 4 relating to the zone 4. The point 19 in both FIGS. 3 and 4 illustrates the pressure 16 and the deformation 15 of the seal in its installed state.

It will be understood that the above description of the present invention is susceptible to various modifications, changes and adaptation, and the same are intended to be comprehended within the meaning and range of equivalents of the appended claims.

What is claimed is:

1. In a sealing gasket having a soft-material plate provided with a throughgoing opening; a sheet metal frame surrounding the opening and formed of an inner and at least one outer superposed sheet metal border flange having a U-shaped cross section; each border flange having legs arranged at opposite faces of the plate along edge zones of said opening; the improvement wherein the legs of the outer border flange are longer than the legs of the inner border flange and further wherein the edge zone of the soft-material plate within the outline of said frame is fully filled with the soft material.

2. A sealing gasket as defined in claim 1, wherein the legs of the outer border flange are at least by ⅓ longer than the legs of the inner border flange.

3. A sealing gasket as defined in claim 1, wherein the inner and outer border flanges have different thicknesses.

4. A sealing gasket as defined in claim 1, wherein said soft-material plate contains an impregnating material; and further wherein said edge zone within the outline of said frame is substantially free from said impregnating material.

* * * * *